United States Patent
Horigami et al.

(10) Patent No.: US 6,398,650 B1
(45) Date of Patent: Jun. 4, 2002

(54) GAME SYSTEM, GAME PROGRESS CONTROL METHOD, AND COMPUTER-READABLE STORAGE MEDIUM WITH A STORED GAME PROGRAM

(75) Inventors: Atsushi Horigami, Tokyo-to; Shinji Morimitsu, Chofu; Tomohiro Maeyama, Koganei; Yasushi Sakano; Jun Nishizawa, both of Tokyo-to, all of (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 0 days.

(21) Appl. No.: 09/517,835

(22) Filed: Mar. 2, 2000

(30) Foreign Application Priority Data

Mar. 5, 1999 (JP) .............................. 11-058091

(51) Int. Cl.[7] .............................. A63F 9/24; A63F 13/00
(52) U.S. Cl. .............................. 463/43; 463/1; 463/23; 463/44
(58) Field of Search .............................. 463/43–44, 1, 463/23

(56) References Cited

U.S. PATENT DOCUMENTS

| | | | | |
|---|---|---|---|---|
| 5,267,734 A | * | 12/1993 | Stamper et al. | 273/434 |
| 5,356,156 A | * | 10/1994 | Suzuki et al. | 273/437 |
| 5,754,770 A | | 5/1998 | Shiels et al. | 395/200.09 |
| 5,805,784 A | | 9/1998 | Crawford | 395/173 |
| 5,807,173 A | * | 9/1998 | Aoyama | 463/23 |
| 5,848,934 A | | 12/1998 | Shiels et al. | 463/9 |
| 5,947,823 A | * | 9/1999 | Nimura | 463/32 |
| 5,993,319 A | * | 11/1999 | Aoyama | 463/43 |
| 6,102,800 A | * | 8/2000 | Kitahara et al. | 463/29 |
| 6,171,189 B1 | * | 1/2001 | Katano et al. | 463/43 |

FOREIGN PATENT DOCUMENTS

JP    10-179937    7/1998

OTHER PUBLICATIONS

"Secrets of the MUD Wizards" by Andrew Busey, copyright 1995 by Sams.net Publishing.*

* cited by examiner

Primary Examiner—Joe H. Cheng
Assistant Examiner—Carmen D. White
(74) Attorney, Agent, or Firm—Jordan and Hamburg LLP

(57) ABSTRACT

A game system in which a plurality of characters are each respectively made to act in dependence on a schedule prescribed in correspondence to a time of a game, at a time point the game has progressed to an end point of a loop range, if a predetermined progress permission condition is met, there is permitted progress of the game ahead of the loop range. If the progress permission condition is not met, the time on the game is made to a start point of the loop range. At this time, exceptional information as part including information associated with an experience on the game by a character as an operation object is maintained in a state attained at the end point of the range, having other information restored in a state corresponding to a start point.

14 Claims, 5 Drawing Sheets

FIG. 3

| EVENTS | | ZELHABORIS | ROLEIL | MOUSE | RUMIE | BAGOS |
|---|---|---|---|---|---|---|
| 1ST DAY | | MEET MOUSE | MEET MOUSE | MEET ROLEIL, ZELHABORIS<br>MEET RUMIE | MEET MOUSE | |
| 2ND DAY | CEREMONY / MARTIAL ARTS PARTY<br>OF JEWEL (E03)<br>(D02) | | | ENTER MARTIAL ARTS PARTY<br>JOIN CEREMONY OF JEWEL<br><br>a MEET BAGOS, HEAR DEVIL FURNACE<br>a> SEE THROUGH POISON | JOIN CEREMONY OF JEWEL<br><br>a> POISONED<br>SAVED FROM POISONING | MEET MOUSE |
| 3RD DAY | BALL<br>(F01) | | MEET MOUSE | HEAR SECRET OF ZELHABORIS FROM ROLEIL<br>a> JOIN BALL WITH RUMIE<br>b GO ALONE TO STOP DEVIL FURNACE<br>c GO WITH RUMIE TO STOP DEVIL FURNACE | a> JOIN BALL WITH MOUSE<br>c> GO WITH MOUSE TO<br>STOP DEVIL FURNACE | |
| 4TH DAY | DEVIL FURNACE<br>EXPLOSION<br>(E07) | | | b> GO TO STOP DEVIL FURNACE→TIME OUT<br>b> FAIL TO STOP DEVIL FURNACE<br>c> STOP DEVIL FURNACE | c> STOP DEVIL FURNACE | c> DIE OF EXPLOSION<br>SURVIVE |
| 5TH DAY | WEDDING<br>(B04)<br><br>BATTLE<br>(B04) | DEFEAT MICE<br>f> BEATEN BY MICE | MARRY ZELHABORIS<br>f> NOT MARRY ZELHABORIS | d HAVE RUMIE JOIN<br>e HAVE BAGOS JOIN<br>f HAVE RUMIE AND BAGOS JOIN<br><br>BEATEN BY ZELHABORIS<br>f> DEFEAT ZELHABORIS | d> BEATEN BY ZELHABORIS | e> BEATEN BY ZELHABORIS |
| 6TH DAY | | | f> SEE OFF | f> SET OFF | f> SEE OFF | f> SEE OFF | a⋯f: ACTION OF MOUSE AFTER AWAKENING    a>⋯f>: EVENTS AFTER ACTION a⋯f:
ALPHANUMERIC IN ( ) DENOTES POSITION ON MAP

NORMAL LOOP

LOOP IN CASE DEFEATING MIDDLE BOSS WHO GOVERNS TIME

IN CASE HAVING DEFEATED FINAL BOSS

GAME SYSTEM, GAME PROGRESS CONTROL METHOD, AND COMPUTER-READABLE STORAGE MEDIUM WITH A STORED GAME PROGRAM

BACKGROUND OF THE INVENTION

1. Field of the Invention

The present invention relates to a game system for progressing a game on a basis such as the time.

2. Description of the Related Art

As a game to be executed on a video game apparatus using a computer, there is known a roll playing game in which a leading character of the game is made to act based on instructions from the player, the leading character being thereby caused to experience various battles and ventures, to achieve a final objective (for example, a rescue of a heroine). As such a kind of game, there is one in which a story on the game is caused to progress in correspondence to variations of time, such as the morning, day and night, and the time is also reflected on actions of a character that appears in the game. Like this, the concept of time is taken in a game, whereby the content of the game can have an enhanced reality.

In conventional games, the flow of time is irreversible, and even if a selection made at a point of time on a game by the player is thereafter found to be improper, this state can not be set back to go afresh. For another selection to be made, the player has to replay from the start. To this point, in a roll playing game, a character has its power as well as levels, such as of available weapons or magic, increased or raised in accordance with the degree of experience in the game. Such settings, based on accumulated experiences, are wholly reset to initial status if the game is replayed from the start, and the player has to repeat unchanged labor. The player may then be get tired of the game.

SUMMARY OF THE INVENTION

It therefore is an object of the invention to provide a game system in which a player is can repeat playing a predetermined range of the game, and experiences gained by a character to be operated are reflected on the game to be repeated, so that the player is kept from getting tired.

A first aspect of the invention to meet the object is a game system which comprises a counting device for performing a count for controlling a progress of a game, a game progress control device for making a plurality of characters, including a character set as an operation object of a player, virtually act to have the game progress in line with a predetermined schedule in correspondence to a count value of the counting device, a progress status storage device for storing various information for discriminating a progress status of the game, including information associated with an experience of the character on the game as the operation object, and an information updating device for updating information stored in the progress status storage device in accordance with the progress status of the game, and in which the schedule is configured to make the progress status of the game change in accordance with information recorded in the progress status storage device, wherein the system comprises a count control device operative, at a time point the game has progressed to an end point of a loop range set in correspondence to the count value of the counting device, when a predetermined progress permission condition is met, for permitting a progress of the game ahead of the loop range, and when the progress permission condition is not met, for making the count value of the counting device retreat to a value corresponding to a start point of the loop range, and an information control device operative, in a case the count value of the counting device is retreated by the count control device to the value corresponding to the start point, for maintaining exceptional information as a part including the information associated with the experience of the character on the game as the operation object out of the information stored in the progress status storage device in a state when at the end point of the loop range, and for having other information restored in an initial state corresponding to the start point.

According to this aspect of invention, at the time point when the game has progressed to an end point of a loop range, if a predetermined progress permission condition is not met, the count value of the counting device is made to retreat to a value corresponding to the start point of the loop range, and the game again progresses from the start point of the loop range. Therefore, the player is allowed to have the contents of the second play and sequels change to be more adequate in accordance with his or her own experiences on the play. Moreover, as there is maintained information associated with an experience on the game by a character as an operation object, the progress of game is modified on the basis of maintained information, in a manner different from the case in which the game is simply replayed. Further, depending on variations in progress of the game, the character as the operation object is allowed to gain many additional experiences, in dependence on which the progress of the game can be varied to be more colorful. It therefore is possible to always give a fresh impression to the player, attracting an interest to the game over a long interval.

A second aspect of the invention is a game system according to the first aspect, wherein the plurality of characters play their allotted rolls on a virtual game field, the schedule is set for executing a roll playing game in which the character as the operation object of the player acts in the virtual game field, aiming at a predetermined target, and the count control device discriminates whether the progress permission condition is met or not, depending on whether or not the character as the operation object has achieved the predetermined target.

According to this aspect of the invention, the game is repeated unless a predetermined target is achieved. By repeated plays on a loop range, a character as an operation object is let to gain experiences, whereby the game is caused to have variations such as in, for example, character's power and kind and quality of available items, as well as increase in number of characters to act as allies, and the schedule can be set to gradually constitute an environment for the target to be achieved in accordance with those variations so that the player tends to positively repeat playing the loop range. The noted target may be set in variety, such as, a win in a battle with a predetermined enemy character, or arrival at a predetermined position on a game field. The game field may be a two-dimensional space or a three-dimensional space.

A third aspect of the invention is a game system according to the second aspect, wherein the game progress control device controls a progress of the game so that the predetermined target is not achieved when the information stored in the progress status storage device fails to meet a predetermined clear condition. According to this aspect of the invention, the game is kept from progressing ahead of the loop range, unless a clear condition is met. It therefore is possible for the player to properly control the number of repetition times of the play until an escape from the loop range, by setting the clear condition. The clear condition can be set in adequate manner, for example, a clear condition may be set not to be met so long as the power of a character as an operation object is kept from exceeding a predetermined level.

A fourth aspect of the invention is a game system according to the third aspect, wherein the schedule is set so that the clear condition is not met unless the predetermined loop range is played a plurality of times. Accordingly, the player tends to securely repeat playing a loop range. Thereby, the action of a respective character is allowed to be set on an assumption that the loop range is played repeatedly, and unlike the case in which a game is simply replayed, the content of the game in the loop range can be set attractive to the player.

A fifth aspect of the invention is a game system according to one of the first to fourth aspects, wherein the schedule has prescribed therein a plurality of actions to be incompatible so long as the loop range is played a single time with respect to the character as the operation object, the game progress control device renders one of the plurality of incompatible actions executed based on an instruction given from the player through a predetermined input apparatus, and the information associated with the experience of the character on the game as the operation object includes information for discriminating whether or not the plurality of incompatible actions are respectively executed.

According to this aspect of the invention, similarly to the fourth aspect, the game can be configured on the assumption that the player repeats playing a loop range a plurality of times. Therefore, when compared with a game to be configured without such an assumption, the part to be repeated can be provided with a novelty to sufficiently attract the player's interest.

A sixth aspect of the invention is a game system according to the first aspect, wherein when a predetermined release condition set with respect to another character of the plurality of characters than the character as the operation object is met at the time point the end point of the predetermined range is reached, information associated with an experience of a character meeting the release condition is contained in the exceptional information.

According to this aspect of the invention, another character than the character as the operation object can also act to have experiences accumulated in accordance with repetition of a loop range, so that the progress status of the game can be modified in accordance with the accumulation. The content of the game can thereby be varied more colorful.

A seventh aspect of the invention is a game system according to the sixth aspect, wherein when the player has the character as the operation object execute a predetermined release action set for the other character, the predetermined release condition is met with respect to the other character constituted as the object of the release action.

According to this aspect of the invention, due to an action of a character as an operation object of the player, another character's experience is repeatedly reflected on a loop range. Therefore, the player's operation is associated deeper with a variation in game content of the loop range, giving rise to an increased interest to the game.

An eighth aspect of the invention is a game system according to the first aspect, wherein the schedule is set in correspondence to a lapse time on the game, and the counting device times the lapse time. According to this aspect of the invention, the game has a concept of time taken therein with an increased reality. Further, as the count value of the counting device is returned, the time is set back on the game so that the player can be impressed with a retroaction of time which is impossible in the real world, thus having an enhanced interest to playing a loop range.

A ninth aspect of the invention is a game system according to the first aspect, wherein the counting device times a lapse time of the game, the plurality of characters play their allotted rolls on a virtual game field, and the schedule is set for executing a roll playing game in which the character as the operation object of the player acts in the virtual game field, aiming at a predetermined target, a correlation is set between a moved distance of the character as the operation object on the game field and a timed value timed by the counting device, a plurality of actions incompatible in relation between the distance on the game field and the lapse time, as actions of the character as the operation object are prescribed in the schedule, and the game progress control device makes one of the plurality of incompatible actions execute based on an instruction given by the player through a predetermined input apparatus, and the information associated with the experience of the character on the game as the operation object includes information for discriminating whether or not the plurality of incompatible actions are respectively executed.

According to this aspect of the invention, the game can be set not to have a progress permission condition meet unless the player selects both of incompatible actions, to thereby keep the player from proceeding with the game ahead of a loop range unless the player repeats playing the loop range. On the game field, there are set places for a plurality of actions to be respectively executed, at locations spaced from each other at distances set in such a relation that, supposing either action to be selected, a character as an operating object is to fail, in a time zone for another action to be executed, to reach a location for the other action to be executed, whereby the schedule can have a plurality of actions prescribed therein to be incompatible until the loop range is played merely one time. The player may repeat playing the loop range, operating the character to search over the game field, into corners or recesses, and such a playing can be assumed to be executed, to have events set up from place to place on the fame field, colorfully presenting the amusingness as well as the depth of the game. Further, the game has a concept of time taken therein with an increased reality, and as the count value of the counting device is returned, the time is set back on the game so that the player can be impressed with a retroaction of time which is impossible in the real world, thus having the higher fun to playing the loop range. The game field may be a two-dimensional space or a three-dimensional space.

A tenth aspect of the invention is a game progress control method comprising the steps of progressing a count value for controlling a progress of a game, making a plurality of characters, including a character set as an operation object by a player, virtually act in dependence on a prescribed schedule in correspondence to the count value to have the game progress, storing in a storage apparatus of a game system various information for discriminating a progress status of the game, including information associated with an experience of the character on the game as the operation object, while updating the information in accordance with the progress status of the game, having the progress status of the game change in accordance with the various information stored in the storage apparatus for discriminating the progress status of the game, operating, at a time point the game has progressed to an end point of a loop range set in correspondence to the count value, when a predetermined progress permission condition is met, for permitting a progress of the game ahead of the loop range, and when the progress permission condition is not met, for making the count value retreat to a value corresponding to a start point of the loop range, and operating, in a case the count value is returned to the value corresponding to the start point, for maintaining a part of an exceptional information including the information corresponded to an experience on the game of the character as the operation object stored in the storage apparatus, in a state at the end of the loop range, and having other information restored in an initial state corresponding to the start point.

This aspect of the invention can be executed to thereby constitute a game system according to the first aspect.

An eleventh aspect of the invention is a computer-readable storage medium with a game-oriented program recorded to have a computer provided in a game system function respectively as a counting device for performing a count for controlling a progress of a game, a game progress control device for making a plurality of characters, including a character set as an operation object of a player, virtually act to have the game progress in line with a prescribed schedule in correspondence to a count value of the counting device, a progress status storage device for storing various information for discriminating a progress status of the game, including information associated with an experience of the character on the game as the operation object, and an information updating device for updating information stored in the progress status storage device in accordance with the progress status of the game, wherein the schedule is configured to make the progress status of the game change in accordance with information recorded in the progress status storage device, and the program is configured to have the computer further function as a count control device operative, at a time point the game has progressed to an end point of a loop range set in correspondence to the count value of the counting device, when a predetermined progress permission condition is met, for permitting a progress of the game ahead of the loop range, and when the progress permission condition is not met, for making the count value of the counting device retreat to a value corresponding to a start point of the loop range, and information control device operative, in a case the count value of the counting device is retreated by the count control device to the value corresponding to the start point, for maintaining a part of an exceptional information including the information corresponded to an experience on the game of the character as the operation object stored in the storage apparatus, in a state at the end of the loop range, and having other information restored in an initial state corresponding to the start point.

According to this aspect of the invention, a program stored in a storage medium can be read by a computer for execution to thereby constitute a game system according to the first aspect.

BRIEF DESCRIPTION OF THE ACCOMPANYING DRAWINGS

FIG. 3 is graph showing, in correspondence to a time on the game, those character actions and events which occur in the map of FIG. 2;

Figure 4A:
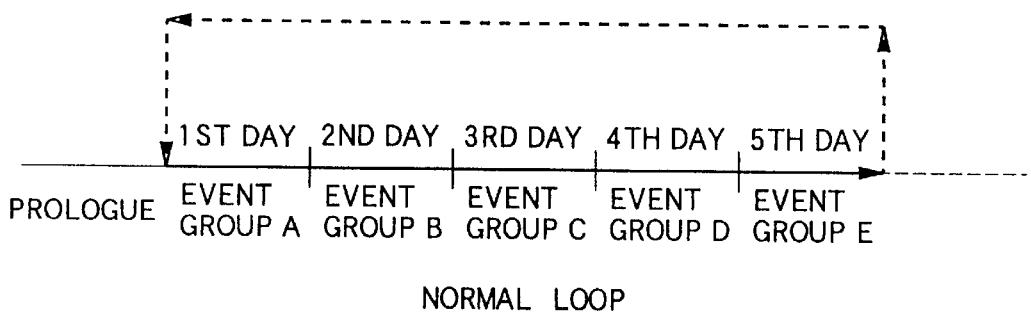
Figure 4B:
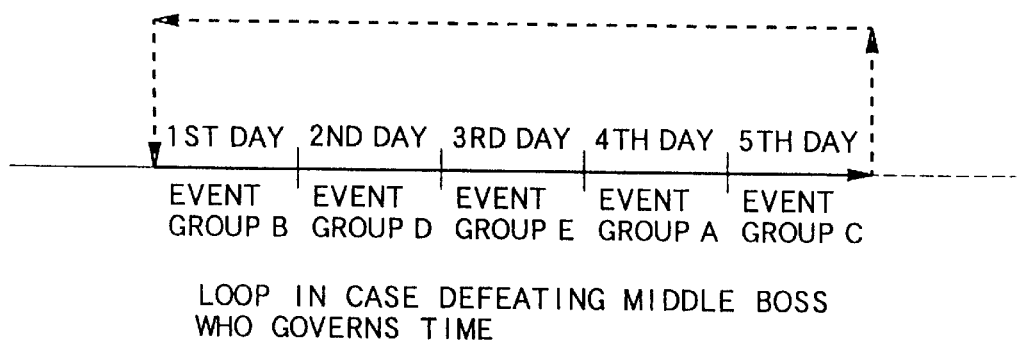
Figure 4C:
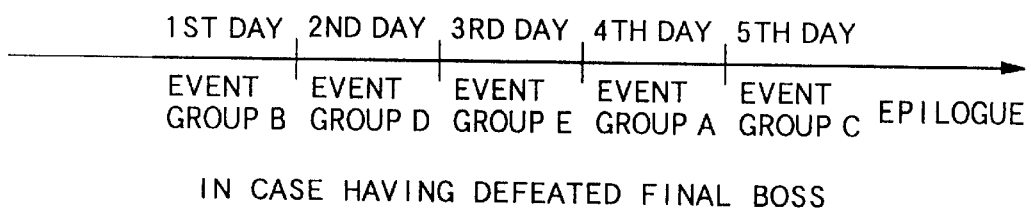
Figure 5:
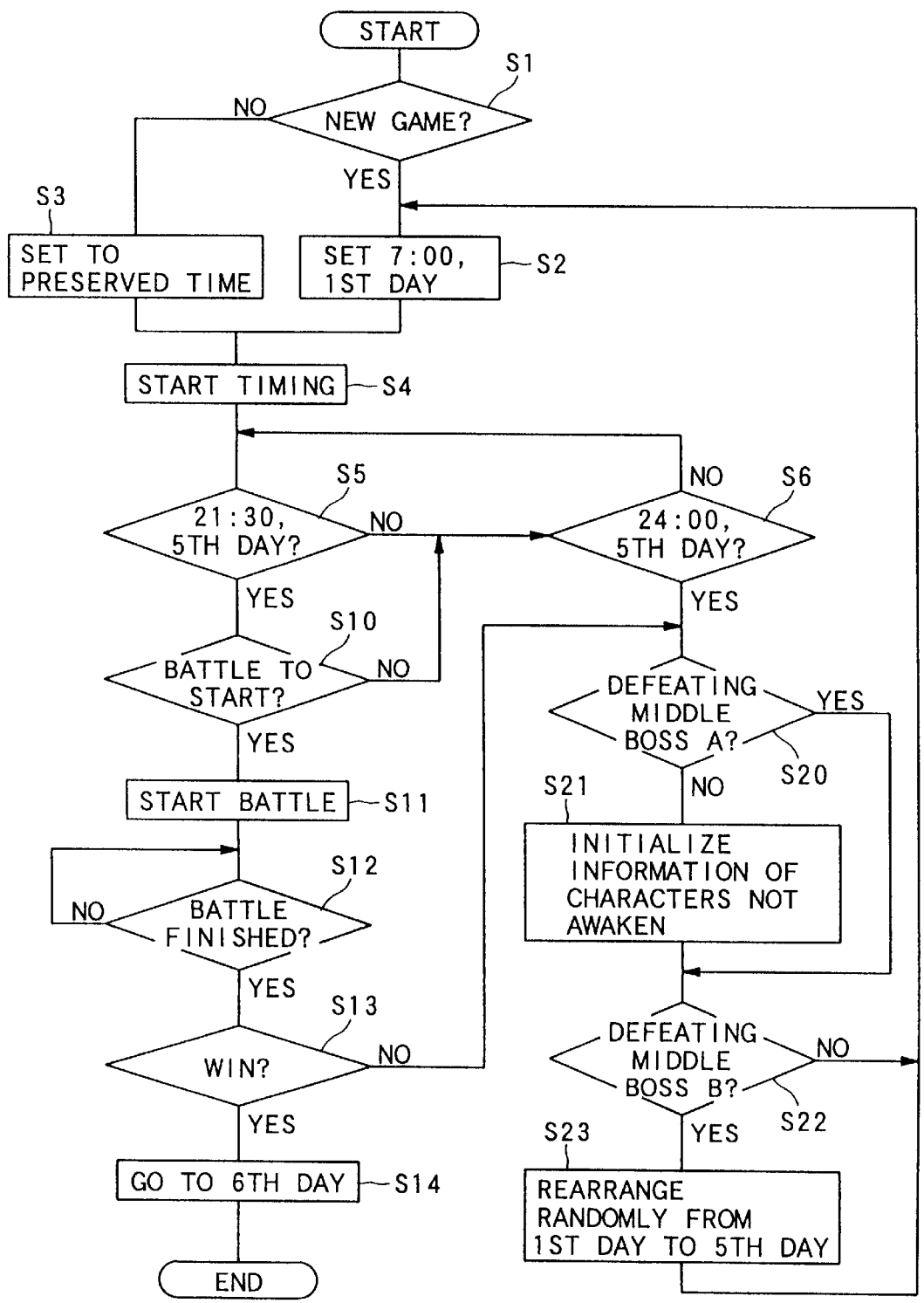

FIGS. 4A–4C covers diagrams illustrating relationships between the flow of the time on the game and events; and FIG. 5 is a flowchart describing procedures of processes to be executed by a CPU to control the progress of time in FIGS. 4A–4C.

DETAILED DESCRIPTION OF THE PREFERRED EMBODIMENTS

Figure 1:
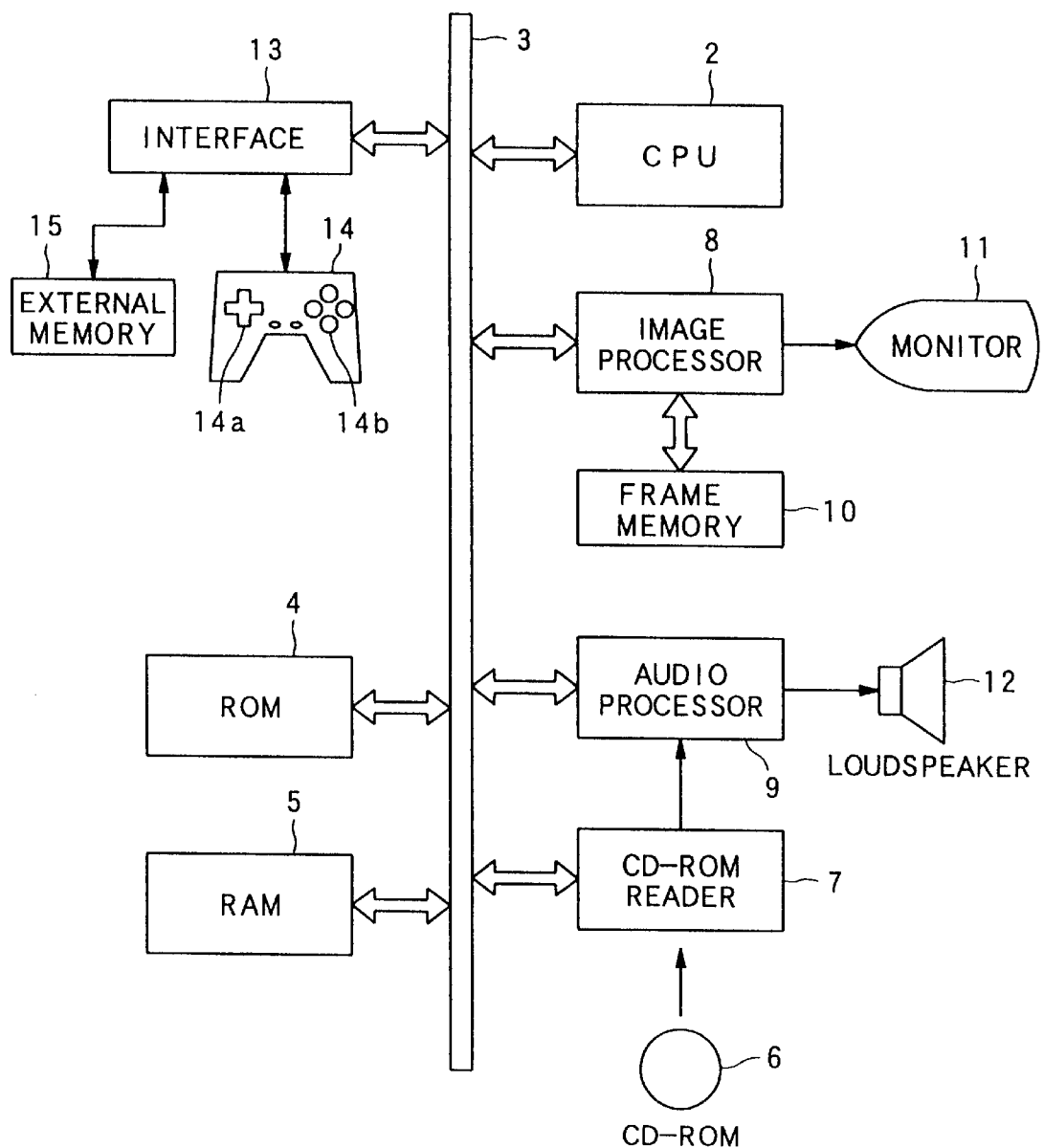
FIG. 1 is a block diagram of a domestic game system according to an embodiment of the invention.

FIG. 1 is a block diagram of a domestic game system according to the invention. As is apparent from the figure, a game system 1 has a CPU 2 constituted mainly with a microprocessor unit. A RAM 5 and a ROM 4 as principal memory are connected via a bus 3 to the CPU 2. The ROM 4 has stored therein an operating system as a necessary program for action control of the entirety of the game system 1, as well as other necessary data. The RAM 5 stores game programs, as well as data, read via a CD-ROM reader 7 from a CD-ROM 6. To temporarily store various data necessary for the progress of the game, the RAM 5 has therein areas set therefor by a program read from the CD-ROM 6. Further, for recording image data read from the CD-ROM 6 and processed by the CPU 2, the RAM 5 has a predetermined video region secured therein. There may be employed a dedicated RAM for display and processing. The game programs may preferably be supplied from a diverse storage medium, such as a semiconductor memory, DVD-ROM, etc, employed in place of the CD-ROM 6.

Further, the CPU 2 has an image processor 8 and an audio processor 9 connected thereto via the bus 3. The image processor 8 reads an image data from a video region of the RAM 5, describing a game picture on a frame memory 10, and converts the described picture into a video signal to be output at a predetermined timing, to be displayed on a monitor 11. The audio processor 9 converts a sound data on the CD-ROM 6, as it is read by the CD-ROM reader 7, into an analog audio signal of a predetermined format to be output from a loudspeaker 12. Moreover, the audio processor 9 follows instructions from the CPU 2 for generating data such as of effect sounds and music sounds, and converts the data into analog signals to be output from the loudspeaker 12. As the monitor 11 and the loudspeaker 12, there may be used a general domestic television receiver and a loudspeaker attached thereto, respectively.

A controller 14 and an external memory 15 are connected via an interface 13 to the bus 3 in a disconnectable manner. The controller 14 is provided with operation members to admit operations from a player. For example, the operation members provided include a cross key 14a for inputting vertical and lateral directions, and push-button switches 14b, etc. The controller 14 outputs therefrom signals corresponding to operated states of the operation members 14a, 14b at a constant interval (1/60 sec., for example), and the CPU 2 is responsible for the signals to discriminate an operation status of the controller 14. The external memory 15 comprises, for example, a semiconductor memory element capable of being rewritten and storing, and adapted for a recording thereto, such as of a data representing a progress status of a game, in accordance with an instruction from the player. The external memory 15 may be provided, for example, as an element constituting a portable game machine that is disconnetably connetable to the interface 13.

Figure 2:
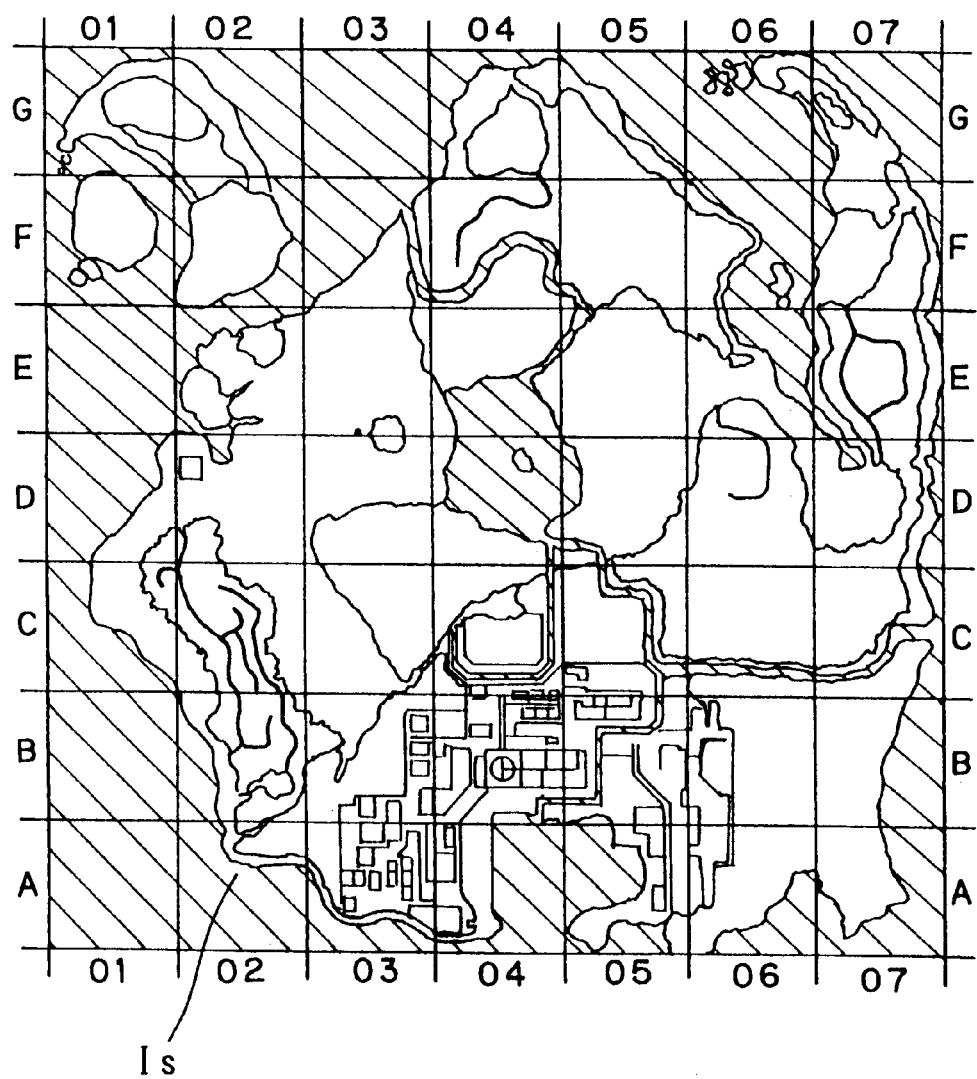
FIG. 2 is a map illustrating a virtual game field for a character to behave in a roll playing game to be executed in the game system of FIG. 1.

On the CD-ROM 6 are stored data as well as a program for executing a roll playing game. FIG. 2 illustrates a map MP of a game field supposed to be a field for the roll playing game to be executed thereon. In this embodiment, the game progresses along a story in which a leading character set as an operation object of the player visits an island IS described in the map MP of FIG. 2, where he gains various experiences, finally slaying a Saturn that has governed the whole island IS, thereby releasing the islanders. There is a concept of time in the game, and a confrontation with the Saturn is scheduled to be the fifth day from the visit date of the leading character to the island.

Events that occur from the first day to the fifth day on the game as well as actions and the like of characters that appear in the game are prescribed in advance on the game program recorded in the CD-ROM 6, as a schedule to control the progress of the game. An example thereof will be described with reference to FIG. 3.

FIG. 3 shows events to occur within the first to the fifth day, and actions of five characters "Zelhaboris", "Roleil", "Mouse", "Rumie" and "Bagos" appearing on the game. In a schedule of the actual game, there may be prescribed more events and characters, while mere parts of them are presented for a convenient description. In FIG. 3, there are set "Zelhaboris" to be a Saturn, "Roleil" to be a princess, "Mouse", to be a leading character set as an operation object of the player, and "Rumie" and "Bagos" to be islanders who come on the side of "Mouse" when a predetermined condition is met. Actions of the leading character "Mouse" are determined on the basis of instructions given from the player via the controller 14.

On the game are scheduled a "Ceremony of Jewell" and a "Martial Arts Party" in the second day, a "Ball" in the third day, a "Devil Furnace Explosion" in the fourth day, and a "Wedding" and a "Decisive Battle" in the fifth day. The "Decisive Battle" corresponds to a pitched battle with the Saturn. Designated in parentheses is a location for an event to be held there and represented in terms of A to G and 01 to 07 given outside the map of FIG. 2. For example, the "Ceremony of Jewel" is held at a "D02" on the map of FIG. 2. For a player to select an event, the character as an operation object of the player must be moved to a location where the event is to be held.

In the schedule of FIG. 3, a plurality of incompatible actions are prescribed. For example, the "Ceremony of Jewel" and "Martial Arts Party" are set to be held at the same time at different locations, and the leading character "Mouse" can join only event of them. There are set additional events such as different of time relative to each other, but to occur at locations in a distance relationship such that a participation to one event disables the participation to the other. For other characters also, there are set a plurality of incompatible actions. For example, as actions of "Roleil" in the fifth day, there are two cases "to marry Zelhaboris" and "not to marry Zelhaboris".

Like this, incompatible actions are selective in an alternative way. As for the leading character "Mouse", which of a plurality of incompatible actions to select is solely put to an instruction of the player to be input from the controller 14. On the other hand, in regard of characters other than the operation object, an automatic selection is made in accordance with a progress status of the game. At respective time points on the game, information on what action a respective character has executed or not is sequentially recorded in the RAM 5, to be referenced as necessary.

Among actions described in FIG. 3, those unlabelled with reference characters a to f are set to be default actions, and the default actions are compulsory for selection within an interval from an initial first to a fifth day promptly after a game start. Along with those of the leading character "Mouse", their occurs the first day to meet "Rolei]." and "Zelhaboris", the second day to enter the "Martial Arts Party" and thereafter to hear a "Devil Furnace" from "Bagos", the third day to hear a secret of "Zelhaboris" from "Roleil", the fourth day to go to stop the "Devil Furnace", to have time out, and the fifth day to pitch with the Saturn, to be beaten. If "Mouse" is beaten by "Zelhaboris", as shown in FIG. 4(a), the time on the game is returned to the first day. In other words, in this game, event groups A to E described in correspondence to the first to the fifth day, respectively, will be repeated unless the pitch with the Saturn leads to a win.

Once the time is returned to the first day, the game is to again progress toward the fifth day. The player can be based on play experiences in the past for selection from actions designated by reference characters a to f, to thereby make the game progress in a different way from the previous time or before. For example, as "Mouse" action in the second day, the player may select, in place of the "Martial Arts Party", the "Ceremony of jewel" designated by reference character a, whereby as shown by reference character a> it is allowed for "Mouse" to see through a "Poison" administered in the ceremony, with the result that "Rumie" is saved from poisoning, and on the third day for "Mouse" and "Rumie" to go together to join the "Ball". There are analogous relationships between reference characters b to f and b> to f>. Like this, as the result of a particular action selected by a character, there is caused a variation in action for the character or another character to take later, whereby the game has a changed progress, such as for example that the character having been set to die on the way of default action is saved from a death and cooperate with the leading character. Incidentally, it also is possible for the player to again select the "Martial Arts Party", without selecting the "Ceremony of Jewel".

As the first to fifth days on the game are repeated, the leading character "Mouse" gains various experiences, wherefrom variations accrue, such as that in response thereto the leading character "Mouse" can have a stronger hit point or increased levels such as of available weapons or magic, or an increased number of ally characters to "Mouse", leading to a gradual arrangement of environment for defeating the "Saturn". With a predetermined condition met, it becomes possible to defeat the "Saturn". If the "Saturn" is beaten, the game enters a sixth day set as an ending.

To enable such a progress of game, the RAM 5 of the game system has various information recorded therein for discriminating a progress status of the game. This information includes necessary information such as related to the power of each character as well as for discrimination of experiences in the past. For example, in regard of the leading character "Mouse", the RAM 5 has recorded therein parameters such as for specifying the hit point, and the types of available weapons and magic, as well as flags for discriminating whether or not various actions provided for the leading character "Mouse" have already been selected. Such information is recorded also for other characters. When the time is returned from the fifth day to the first day, the information on the leading character "Mouse" is maintained as it is. The player is thereby allowed to repeat the first to fifth days, without missing experiences the leading character "Mouse" has gained.

In the game system described above, after a predetermined initializing operation (for example, power throw-in), the CPU 2 first follows the program of ROM 4 to execute a predetermined initializing process. After this initialization, the CPU 2 starts reading programs from the CD-ROM 6, and enters a game processing in accordance with them. When the player has performed a predetermined game start operation to the controller 14, the CPU 2 responds to a resultant instruction to start various necessary processes for execution of the game. Among the processes to be then started, those for controlling the flow of time, particularly for the first to fifth days, are described as procedures in a flowchart of FIG. 5.

In the flowchart of FIG. 5, a first decision is made as to which is selected between a case in which a player restarts a game on its way by reading data stored in the external memory 15, and a case in which a game is started entirely anew (step S1).

If an instruction is given for a new game start, a timer for timing a lapse time on the game is set an initial value, 7:00 a.m. of the first day (step S2). On the other hand, in the case a game is restarted on the basis of data from the external memory 15, the timer is set a time specified by the data (step S3). Then, after the timer setting, the timing is started (step S4). In dependence on the timing then started by the timer, events and actions of respective characters on the game are controlled. The timing by the timer proceeds, for example, 1 minute on the game in correspondence to 1 second on the real time. Incidentally, the timer may be of a type for direct measurement of time, or of a type that counts a parameter in correlation to the time. In other words, in the case the game system is provided with a timer circuit, a timed value therefrom can substitute for a lapse time on the game. In the case of absence of such a timer circuit, a parameter correlated with the lapse time may be counted to replace the time on the game. For example, the number of steps of the leading character may be counted to provide a count value for replacement with the time to be timed.

As the timing is started, the control flow goes to a step S5, where it is decided whether a current time is 21:30 of a fifth day, or not. If the decision is negative, it is decided whether the current time is 24:00 of the fifth day or not. If this is denied, the flow again goes to the step S5. While decisions are repeated at steps S5 and S6, the CPU 2 executes paralleled processes for controlling various events and character actions on the game based on a timed value of the timer having started at the step S4.

As the game progresses to 21:30 of the fifth day, an affirmative decision at the step S5 allows the flow to go to a step S10. At the step S10, a battle start requirement is judged as to whether it is met. For example, a predetermined region in the map of FIG. 2 may be set in advance as a pitching place, and if the leading character is present there, the battle start requirement may be decided to be met. If it is not there, the battle start requirement is decided not to be met. There may be such a setting that a movement to the pitching place will not occur until a predetermined condition is met.

When the battle start requirement is met, a decision is made to start a battle (step S11). The CPU 2 is thereby allowed for execution of a routine for a battle process, so that the player can have a player side party fight with the Saturn, with reference to an instruction the player has input via the controller 14, while the player side party includes a character as an operation object of the player and ally characters for the character. After the battle start, a decision is made whether the battle is finished or not (step S12). If the battle is finished, there is made a decision as to whether the player side party has won (step S13). This condition corresponds to a progress permission condition.

As described, in the battle with the Saturn, the player side party can not win unless a predetermined clear condition is met. For example, the player never wins, such as when the leading character's power has not exceeded a certain level, or when the leading character has not experienced a particular event or the player side party has failed to include a particular character. Moreover, the events and character actions of FIG. 3 may have a correlation therebetween determined so as to allow the condition for win to be met only after a play over a loop range of first to fifth days has been repeated a predetermined number of times. For example, the condition for winning a battle may require participation to both of incompatible events, such as the "Ceremony of Jewel" and the "Martial Arts Party" on the second day and selective merely either one, so that the first to fifth days have to be experienced at least twice before wining the Saturn.

While the condition for win is not met, the step S13 has a negative decision, which directs the flow to a step S20. Also with a decision for 24:00 of the fifth day at the step S6, the flow comes to the step S20. In processes at steps S20 and sequels, decisions are made of whether or not the player has defeated characters set as middle bosses A, B (steps S20, S22). In dependence on results of the decisions, processes at steps S21, S23 are respectively executed or skipped, before the flow comes to the step S22. Thereby, the timer setting is returned to 7:00 a.m. of the first day, and the game is to progress along the schedule, again from the first day. The number of times of return to the first day may be recorded in the RAM 5, to be employed as an additional requirement to win the Saturn.

Incidentally, the middle boss A of the step S20 is set as a representative o f islanders spirits, and the middle boss B of the step S22 is set as a character governing the flow of time. If the middle boss A is not beaten by the player, information recorded in the RAM 5 with respect to the character of islander is initialized (step S21).

In other words, in this game, it is assumed that islanders are unaware of repetition of time and those actions set as defaults in a schedule of first to fifth days are repeated over a long time, and for this presentation the information recorded in the RAM 5 as of the character of islander is returned to a state when at the game start in the first day. However, when a predetermined condition is met, the islander is deemed to be "awaken", and information on the character of the awaken islander is not initialized at the step S21. For example, if the leading character "Mouse" selects a predetermined action to a certain islander, this islander gets "awaken" and thereafter information on this islander is kept from being initialized, even when the time is returned to the first day.

Therefore, various information recorded in the RAM 5 with respect to the awaken islander is succeeded even after the time has returned, like the leading character, so that this islander will there after take different actions. For example, in FIG. 3, even when "Mouse" has "Bagos" joine the same side in the fifth day, if a necessary action for awakening "Bagos" has not been selected by the player, then information on "Bagos" is initialized when returning to the first day at the step S21, with the result that "Mouse" is unable to meet "Bagos" untill the second day comes. However, if "Bagos" is awaken, the information of being "ally" is succeeded, so that "Bagos" acts as an ally of "Mouse" from the first day.

Such a processing may be effected by storing in the RAM 5 respective flags for discriminating whether "Bagos" is awaken or not and has become "ally" or not, and at the step S21 by making a decision whether the "awaken" flag is set or not, resetting the "ally" flag if the "awaken" flag is not set, and holding the "ally" flag as it is when the "awaken" flag is set. In this case, being "awaken" corresponds to a release condition.

If the middle boss A is judged to be beaten at the step S20, the step S21 is skipped and the flow goes to the step S22. Thereby, after the middle boss A is beaten, information on every character is kept from being initialized.

And, if the middle boss B is judged to be beaten at the step S20, it so follows at the step S23 that event groups of the first to fifth days are changed in array sequence, for example, they are randomly replaced as shown in FIG. 4(b). This is for presentation of the fact that a regular repetition from the first day to the fifth day has become unable to be maintained due to a defeat of the middle boss B. There can thus be introduced a confusion in the game, for example, such that an event to occur on the second day is caused to arise on the fourth day. On the other hand, if the middle boss B is judged not to be beaten at the step S22, then the step S23 is skipped and the flow again goes to the step S2.

In due course, as the foregoing processes are repeated, the leading character may have a raised level or ally islanders may be increased in number, thereby having a condition met for winning the Saturn. When the condition for win has been met and if the leading character is adequately operated by the player through the controller 14, then the battle will lead to a win. As a result of this, the step S13 provides an affirmative decision for allowing a progress of the game into the sixth day (step S14). Thereby, the game is allowed to advance toward an epilogue of the sixth day in dependence on a timing by the timer, as shown in FIG. 4(c).

In the embodiments described, a game control apparatus is constituted with a CPU 2, and various device of the game control apparatus are constituted as combinations of the CPU and particular software. Such device may however be replaced by a logic circuit, at least partly.

The present invention is not restricted to the foregoing embodiments, but can be executed in various forms. For example, the invention is not limited to a fighting in a roll playing game, but is applicable to systems for execution of such a game that has a character repeatedly brought into actions, irrespective of the genre. The invention may well be configured as a variety of scales of game systems, no matter if they address a domestic game system.

As explained in the foregoing description, according to the invention, the player repeatedly plays a certain range on a prescribed schedule, having maintained information associated with an experience on a game by a character as an operation object, and the player is allowed for a chance to have the contents of the second play and sequels changed to be more adequate in accordance with own experiences on the play. Moreover, as there is maintained the information associated with an experience of the character on the game as an operation object, unlike the case in which the game is simply replayed, one can modify the progress of game on the basis of maintained information so that, depending on variations in progress of the game, the character as the operation object is allowed to gain many additional experiences. It therefore is possible to always give a fresh impression to the player, attracting an interest to the game over a long interval.

What is claimed is:

1. A game system comprising:
    a counting device for performing a count for controlling a progress of a game;
    a game progress control device for making a plurality of characters, including a character set as an operation object of a player, virtually act to have the game progress in line with a predetermined schedule in correspondence to a count value of the counting device;
    a progress status storage device for storing various information for discriminating a progress status of the game, including information associated with an experience of the character on the game as the operation object;
    an information updating device for updating information stored in the progress status storage device in accordance with the progress status of the game, and in which the schedule is configured to make the progress status of the game change in accordance with information recorded in the progress status storage device;
    a count control device operative, at a time point the game has progressed to an end point of a loop range set in correspondence to the count value of the counting device, when a predetermined progress permission condition is met, for permitting a progress of the game ahead of the loop range, and when the progress permission condition is not met, for making the count value of the counting device retreat to a value corresponding to a start point of the loop range; and
    an information control device operative when the count value of the counting device is retreated by the count control device to the value corresponding to the start point, for maintaining exceptional information as a part including the information associated with the experience of the character of the game as the operation object from the information stored in the progress status storage device in a state when at the end point of the loop range, and for having other information restored to an initial state corresponding to the start point.

2. A game system according to claim 1, wherein the plurality of characters play their allotted roles on a virtual game field, the predetermined schedule is set for executing a role playing game in which the character as the operation object of the player acts in the virtual game field, aiming at a predetermined target, and the count control device discriminates whether the progress permission condition is met or not, depending on whether or not the character as the operation object has achieved the predetermined target.

3. A game system according to claim 2, wherein the game progress control device controls a progress of the game so that the predetermined target is not achieved when the information stored in the progress status storage device fails to meet a predetermined clear condition.

4. A game system according to claim 3, wherein the schedule is set so that the clear condition is not met unless the predetermined loop range is played a plurality of times.

5. A game system according to one of claims 1 to 4, wherein the predetermined schedule has prescribed therein a plurality of actions to be incompatible so long as the loop range is played a single time with respect to the character as the operation object, the game progress control device renders one of the plurality of incompatible actions executed based on an instruction given from the player through a predetermined input apparatus, and the information associated with the experience of the character on the game as the operation object includes information for discriminating whether or not the plurality of incompatible actions are respectively executed.

6. A game system according to claim 1, wherein when a predetermined release condition set with respect to another character of the plurality of characters other than the character as the operation object is met at the time point that the end point of the loop range is reached, information associated with an experience of the other character meeting the release condition is contained in an exceptional information of the other character meeting the release condition.

7. A game system according to claim 6, wherein when the player has the character as the operation object execute a predetermined release action set for the other character, the predetermined release condition is met with respect to the other character constituted as the object of the release action.

8. A game system according to claim 1, wherein the predetermined schedule is set in correspondence to a lapse time on the game, and the counting device times the lapse time.

9. A game system according to claim 1, wherein:
the counting device times a lapsed time of the game;
the plurality of characters play their allotted roles on a virtual game field, and the predetermined schedule is set for executing a role playing game in which the character as the operation object of the player acts in the virtual game field, aiming at a predetermined target;
a correlation is set between a moved distance of the character as the operation object on the game field and a timed value timed by the counting device;
a plurality of actions incompatible in relation between the distance on the game field and the lapsed time, as actions of the character as the operation object, are prescribed in the predetermined schedule; and
the game progress control device makes one of the plurality of incompatible actions executed based on an instruction given by the player through a predetermined input apparatus, and the information associated with the experience of the character on the game as the operation object includes information for discriminating whether or not the plurality of incompatible actions are respectively executed.

10. A game progress control method comprising the steps of:
progressing a count value for controlling a progress of a game;
making a plurality of characters, including a character set as an operation object by a player, virtually act in dependence on a prescribed schedule in correspondence to the count value to have the game progress;
storing in a storage apparatus of a game system various information for discriminating a progress status of the game, including information associated with an experience of the character on the game as the operation object, while updating the information in accordance with the progress status of the game;
having the progress status of the game change in accordance with the various information stored in the storage apparatus for discriminating the progress status of the game;
operating, at a time point the game has progressed to an end point of a loop range set in correspondence to the count value, when a predetermined progress permission condition is met, to permit a progress of the game ahead of the loop range, and when the progress permission condition is not met, to make the count value retreat to a value corresponding to a start point of the loop range; and
operating, when the count value is returned to the value corresponding to the start point, to maintain a part of an exceptional information including the information corresponding to an experience of the game of the character as the operation object stored in the storage apparatus, in a state at the end of the loop range, and to have other information restored in an initial state corresponding to the start point.

11. A computer-readable storage medium with a game-oriented program recorded to have a computer provided in a game system comprising:

a counting device for performing a count for controlling a progress of a game;
a game progress control device for making a plurality of characters, including a character set as an operation object of a player, virtually act to have the game progress in line with a prescribed schedule in correspondence to a count value of the counting device;
a progress status storage device for storing various information for discriminating a progress status of the game, including information associated with an experience of the character on the game as the operation object;
an information updating device for updating information stored in the progress status storage device in accordance with the progress status of the game, wherein
the schedule is configured to make the progress status of the game change in accordance with information recorded in the progress status storage device, and
the program is configured to have the computer further function as a count control device operative, at a time point the game has progressed to an end point of a loop range set in correspondence to the count value of the counting device, when a predetermined progress permission condition is met, for permitting a progress of the game ahead of the loop range, and when the progress permission condition is not met, for making the count value of the counting device retreat to a value corresponding to a start point of the loop range; and
an information control device operative when the count value of the counting device is retreated by the count control device to the value corresponding to the start point, for maintaining a part of exceptional information including the information corresponded to an experience on the game of the character as the operation object out of the information stored in the progress status storage device, in a state at the end of the loop range and, having other information restored in an initial state corresponding to the start point.

12. A game system comprising:
a counting device for performing a count for controlling a progress of a game;
a game progress control device having a plurality of characters, including a character set as an operation object of a player, virtually act to have the game progress in accordance with a predetermined schedule in corresponding to a count value of the counting device;
a progress status storage device for storing various information for discriminating a progress status of the game, including information associated with an experience of the character on the game as the operation object;
an information updating device for updating information stored in the progress status storage device in accordance with the progress status of the game, wherein the predetermined schedule is configured to make the progress status of the game change in accordance with information recorded in the progress status storage device;
a count control device operative when the game has progressed to an end point of a loop range set according to the count value of he counting device, and if a predetermined progress permission condition is met, then the game is permitted to progress ahead of the loop range, and if the progress permission condition is not met, then the count value of the counting device retreats to a value corresponding to a start point of the loop range; and an information control device operative when the count value of the counting device is retreated by the count control device to the value corresponding to the start point, for maintaining exceptional information including the information associated with the experience of the character of the game as the operation object from the information stored in the progress status storage device at the end point of the loop range, and for having other information restored to an initial state corresponding to the start point.

13. A game progress control method comprising the steps of:

progressing a count value for controlling a progress of a game;

having a plurality of characters, including a character set as an operation object by a player, virtually act in dependence on a prescribed schedule according to the count value so that the game progresses;

storing in a storage apparatus of a game system various information for discriminating a progress status of the game, including information associated with an experience of the character of the game as the operation object, while updating the information in accordance with the progress status of the game;

having the progress status of the game change in accordance with the various information stored in the storage apparatus for discriminating the progress status of the game;

operating when an end point of a loop range set according to the count value is reached and if a predetermined progress permission condition is met, to permit progress of the game ahead of the loop range, and if the progress permission condition is not met, to have the count value retreat to a value corresponding to a start point of the loop range; and operating, when the count value is returned to the value corresponding to the start point, to maintain exceptional information including the information corresponding to an experience of the game of the character as the operation object stored in the storage apparatus, in a state at the end of the loop range, and to have other information restored in an initial state corresponding to the start point.

14. A computer-readable storage medium with a game oriented program recorded to have a computer provided in a game system comprising:

a counting device for performing a count for controlling a progress of a game;

a game progress control device having a plurality of characters, including a character set as an operation object of a player, virtually act to have the game progress in accordance with a prescribed schedule corresponding to a count value of the counting device;

a progress status storage device for storing various information for discriminating a progress status of the game, including information associated with an experience of the character of the game as the operation object;

an information updating device for updating information stored in the progress status storage device in accordance with the progress status of the game, wherein the prescribed schedule is configured to make the progress status of the game change in accordance with information recorded in the progress status storage device, and the program is configured to have the computer further function as a count control device operative when the game has progressed to an end point of a loop range set according to the count value of the counting device, and if a predetermined progress permission condition is met, then permitting the game to progress ahead of the loop range, and if the progress permission condition is not met, then the count value of the counting device retreats to a value corresponding to a start point of the loop range; and an information control device operative when the count value of the counting device is retreated by the count control device to the value corresponding to the start point, for maintaining exceptional information including the information corresponding to an experience on the game of the character as the operation object out of the information stored in the progress status storage device, at the end of the loop range and, having other information restored in an initial state corresponding to the start point.

* * * * *